Patented Aug. 18, 1942

2,293,032

UNITED STATES PATENT OFFICE 2,293,032

α-N-AMYL CINNAMAL ETHYL CYANOACETATE

Ingenuin Hechenbleikner, Stamford, Conn., assignor to American Cyanamid Company, New York, N. Y., a corporation of Maine No Drawing. Application August 30, 1941, Serial No. 409,120

1 Claim. (Cl. 260—465)

The present invention relates to α-n-amyl cinnamal ethyl cyanoacetate, a new compound which is of particular interest as an intermediate in the preparation of the corresponding amine, amide and acid, as a plasticizer for synthetic resins, and as an insecticidal agent. It is highly effective in controlling soft-bodied and sucking insects which are particularly difficult to exterminate, for example the citrus red spider, Tetranychus citri, and the bean aphid, Aphis rumicis.

The following example, in which the parts are by weight, illustrates a specific method of preparing the above compound in accordance with the invention.

Example 40 parts of α-n-amyl cinnamaldehyde were gradually added to 24 parts of ethyl cyanoacetate cooled to 0° C. One part of piperidine (catalyst) was added and the mixture then allowed to stand for 12 hours in a closed vessel at approximately 5° C. Considerable water had separated at the end of this period. The mixture was allowed to stand at room temperature (20° C.) for an additional 24 hours. The reaction product was dissolved in ether, washed neutral (0.05% $H_2SO_4$), dried over sodium sulfate and distilled at reduced pressure. The α-n-amyl cinnamal ethyl cyanoacetate was recovered as a light yellow oil distilling at 155° C. at less than 1 mm. pressure.

Although this new compound is especially effective as a contact poison for the control of insect pests, it may also be used for fungicidal and bactericidal purposes.

While the invention has been described with particular reference to specific embodiments it is to be understood that it is not to be limited thereto but is to be construed broadly and restricted solely by the scope of the appended claim.

I claim:

α-n-amyl cinnamal ethyl cyanoacetate.

INGENUIN HECHENBLEIKNER.